（12）United States Patent
Zhou

(10) Patent No.: US 9,910,204 B2
(45) Date of Patent: Mar. 6, 2018

(54) BACKLIGHT MODULE AND LIQUID CRYSTAL DISPLAY

(71) Applicant: SHENZHEN CHINA STAR OPTOELECTRONICS TECHNOLOGY CO., LTD., Shenzhen (CN)

(72) Inventor: Gege Zhou, Shenzhen (CN)

(73) Assignee: SHENZHEN CHINA STAR OPTOELECTRONICS TECHNOLOGY CO, LTD., Shenzhen (CN)

( * ) Notice: Subject to any disclaimer, the term of this patent is extended or adjusted under 35 U.S.C. 154(b) by 0 days.

(21) Appl. No.: 14/417,996

(22) PCT Filed: Dec. 24, 2014

(86) PCT No.: PCT/CN2014/094825
§ 371 (c)(1),
(2) Date: Jun. 6, 2016

(87) PCT Pub. No.: WO2016/086473
PCT Pub. Date: Jun. 9, 2016

(65) Prior Publication Data
US 2017/0269281 A1    Sep. 21, 2017

(30) Foreign Application Priority Data
Dec. 3, 2014 (CN) .......................... 2014 1 0725060

(51) Int. Cl.
*F21V 7/04* (2006.01)
*F21V 8/00* (2006.01)

(52) U.S. Cl.
CPC ......... *G02B 6/0031* (2013.01); *G02B 6/0068* (2013.01); *G02B 6/0083* (2013.01); *G02B 6/0088* (2013.01)

(58) Field of Classification Search
CPC .. F21S 8/00; F21V 13/00; F21V 19/00; F21V 7/04; G02F 1/13357; G02B 6/0031; G02B 6/0068; G02B 6/0073; G02B 6/0088
See application file for complete search history.

(56) References Cited

U.S. PATENT DOCUMENTS 8,698,972 B2 *   4/2014   Kim ...................... G02F 1/1333
                                                     349/58

FOREIGN PATENT DOCUMENTS

CN      101881402 A     11/2010
CN      102080789 A      6/2011
(Continued)

OTHER PUBLICATIONS

International Search Report and Written Opinion of the International Searching Authority (Forms PCT/ISA/210, PCT/ISA/220 and PCT/ISA/237) dated Sep. 9, 2015, by the International Bureau of WIPO, in corresponding International Application No. PCT/CN2014/094825. (12 pages).
(Continued)

*Primary Examiner* — Ali Alavi
(74) *Attorney, Agent, or Firm* — Buchanan Ingersoll & Rooney PC

(57) ABSTRACT

A backlight module and a liquid crystal display are related. The backlight module comprises a light guide plate and a light source arranged on a light-incident side of the light guide plate. The light source includes a plurality of luminous points that are arranged along a line and spaced from each other, and is arranged with a reflective member in a reflective side thereof away from the light guide plate, the reflective member directly facing a space formed between two adjacent luminous points. The reflective member reflects scattered light that enters the space into the light guide plate. The backlight module according to the present
(Continued)

disclosure ensures rather homogeneous brightness in a light source area, and therefore substantially attenuates or even eliminates high bright spots that would otherwise appear in the liquid crystal display.

10 Claims, 2 Drawing Sheets

(56) References Cited

FOREIGN PATENT DOCUMENTS

| CN | 102840520 A | 12/2012 |
| CN | 202835052 U | 3/2013 |
| EP | 2743573 A1 | 6/2014 |
| JP | 2001043720 A | 2/2001 |
| WO | 2013061855 A1 | 5/2013 |

OTHER PUBLICATIONS

Office Action dated Feb. 1, 2016, by the State Intellectual Property Office of China in corresponding Chinese Patent Application No. 201410725060.X. (6 pages).

\* cited by examiner

BACKLIGHT MODULE AND LIQUID CRYSTAL DISPLAY

CROSS-REFERENCE TO RELATED APPLICATIONS

The present application claims benefit of Chinese patent application CN 201410725060.X, entitled "Backlight module and liquid crystal display" and filed on Dec. 3, 2014, the entirety of which is incorporated herein by reference.

FIELD OF THE INVENTION

The present disclosure relates to the field of liquid crystal display, and in particular, to a backlight module. The present disclosure further relates to a liquid crystal display comprising the backlight module.

BACKGROUND OF THE INVENTION

As display components of electronic devices, liquid crystal displays have been widely used in a variety of electronic products. In a liquid crystal display, liquid crystals per se do not emit light, but are capable of modulating light from a backlight module, thus presenting graphics or characters. Therefore, the structure of the backlight module will directly influence the display effects of the liquid crystal display.

In the prior art, backlight modules can be divided into under-mounted and side-mounted (or side-lit) types based on the positional relationship between the light source and the light guide plate. Side-mounted backlight modules render liquid crystal displays lighter and thinner, and therefore have been most widely used. A side-mounted backlight module generally comprises a light guide plate, a reflective sheet arranged under the light guide plate, and a light source arranged at a side of the light guide plate. Light emitted from the light source enters the light guide plate from the side portion thereof to illuminate the whole panel under the guidance of the light guide plate.

Currently, narrow-framed liquid crystal displays are increasingly popular. As the frame of a liquid crystal display becomes narrower, high bright spots tend to appear in an area of the liquid crystal display where the light source is arranged, thus severely deteriorating the quality of the liquid crystal display.

SUMMARY OF THE INVENTION

To solve the above problem, the present disclosure provides a backlight module. According to the present disclosure, homogeneous brightness in a light source area of the backlight module can be achieved, which substantially attenuates or even eliminates high bright spots that would otherwise appear in liquid crystal display. The present disclosure further provides a liquid crystal display comprising the backlight module.

According to a first aspect of the present disclosure, the backlight module comprises a light guide plate and a light source arranged on a light-incident side of the light guide plate. The light source includes a plurality of luminous points that are arranged along a line and spaced from each other, and is arranged with a reflective member at a reflective side thereof away from the light guide plate, the reflective member directly facing a space formed between two adjacent luminous points. The reflective member reflects scattered light that enters the space into the light guide plate.

According to the backlight module of the present disclosure, a difference of brightness formed between the luminous points and the space can be attenuated or even eliminated, since the reflective member will reflect the light that enters the space into the light guide plate. This can significantly improve homogeneity of brightness in the light source area, and that in the light guide plate, thereby attenuating or even eliminating high bright spots that would otherwise appear in the liquid crystal display.

In one embodiment, the reflective member is in the form of a concave member, and the scattered light illuminates the concave member after passing through a focus of the concave member. This enables scattered light in all directions to be altered into parallel light before entering the light guide plate. With respect to the light guide plate, incident light from the space and that from the luminous points are of the same direction, and therefore can be transmitted in the same way by the light guide plate. As a result, brightness of the liquid crystal display can be further homogenized.

In one embodiment, the backlight module further comprises a reflective sheet, which is arranged below the light guide plate, and extends toward the reflective member to contact the reflective member. The reflective sheet can reflect the light exiting from below the light guide plate back into the light guide plate again, so as to further improve brightness of the liquid crystal display.

In one preferred embodiment, a contact zone between the reflective sheet and the reflective member is located in the reflective side. Thus, reflective light exiting from the contact zone can also be further reflected by the reflective member to enter the light guide plate. This contributes to improvement of the brightness of the liquid crystal display.

In another embodiment, the reflective sheet is formed into one piece with the reflective member. This can prevent the reflective member from being accidently dislocated.

In one embodiment, the backlight module further comprises a frame arranged in the reflective side, wherein the reflective member is located between the frame and the light source.

In one preferred embodiment, the reflective member is arranged on the frame in a region thereof directly facing the space formed between two adjacent luminous points. Such a structure enables the frame to support and limit the reflective member, and thus prevent the reflective member from being accidently dislocated. In addition, an existing surface-mount device can be used for mounting the reflective member to the frame, thereby significantly facilitating mounting of the reflective member.

In one embodiment, the frame is provided with a concave structure in a region thereof directly facing the space formed between two adjacent luminous points, and the reflective member is formed by coating a reflective layer on the concave structure. In such a structure, the reflective member and the frame are formed into one piece, thereby entirely preventing the reflective member from being accidently dislocated, and improving reliability of the display performance of the liquid crystal display. Moreover, a mounting step for the reflective member can be saved, thus significantly improving production efficiency.

In one embodiment, the backlight module further comprises a light source circuit board electrically connected to the light source.

According to a second aspect of the present disclosure, a liquid crystal display is provided, comprising the backlight module according to the first aspect of the present disclosure.

In the present disclosure, the direction term "front" refers to a direction facing the liquid crystal display panel. And the direction term "back" refers to a direction opposite to the front direction, i.e., the direction facing a back plate of the liquid crystal display.

Compared with the prior art, the present disclosure has the following advantages. At the outset, according to the backlight module of the present disclosure, a difference of brightness formed between the luminous points and the space can be attenuated or even eliminated, since the reflective member will reflect the light that enters the space into the light guide plate. This can significantly improve homogeneity of brightness in the light source area, and that in the light guide plate, thereby attenuating or even eliminating high bright spots that would otherwise appear in the liquid crystal display. In addition, the reflective member is in the form of a concave member, and thus enables scattered light in all directions to be altered into parallel light before entering the light guide plate. This can result in more homogeneous brightness of the liquid crystal display.

BRIEF DESCRIPTION OF THE DRAWINGS

In the following, the present disclosure will be illustrated in detail in connection with embodiments and accompanying drawings, in which.

Figure 1:
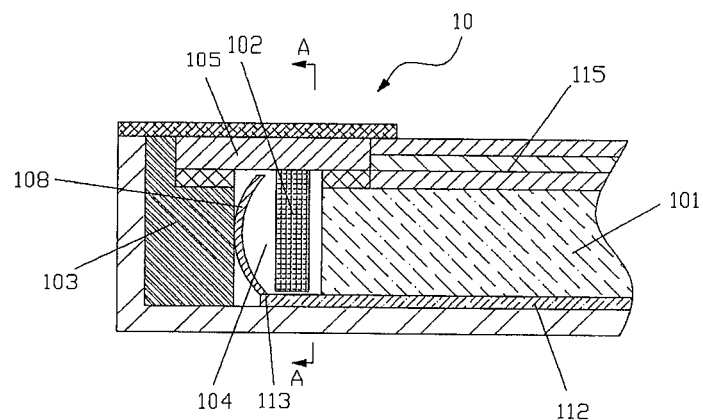
FIG. 1 schematically shows the structure of a backlight module according to a first embodiment of the present disclosure.

In the drawings, the same components are indicated with the same reference signs. The figures are not drawn in accordance with an actual scale.

DETAILED DESCRIPTION OF THE EMBODIMENTS

The present disclosure will be further explained in conjunction with the accompanying drawings.

Figure 2:
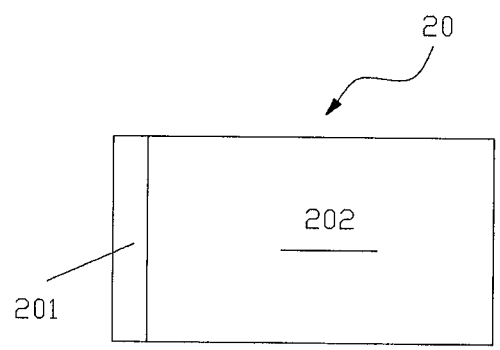
FIG. 2 schematically shows a liquid crystal display according to the present disclosure.

FIG. 1 schematically shows a backlight module 10 according to a first embodiment of the present disclosure. As indicated in FIG. 1, the backlight module 10 comprises a light guide plate 101, and a light source 102 arranged on a light-incident side of the light guide plate 101. An optical diaphragm 115 is arranged on the light guide plate 101 for displaying pictures. The light source 102 is located at a side of the light guide plate 101, and thus the backlight module 10 is side-mounted. FIG. 2 shows a liquid crystal display 20 which includes the backlight module 10, or a backlight module 40 to be described in a second embodiment, of the present disclosure. In FIG. 2, a mounting area 201 and a visual area 202 of the backlight module are schematically shown.

The backlight module 10 further comprises a light source circuit board 105 which is electrically connected to the light source 102 for supplying power thereto, and a frame 103 which is arranged at a side of the light source 102 away from the light guide plate 101, i.e., a reflective side 104 to be explained in the following. As can be seen from FIG. 1, the frame 103 and the light guide plate 101 are located at two sides of the light source 102, respectively. The frame 103 can be used for fitting the light guide plate 101, the light source 102, and the light source circuit board 105 together. The structures and the mounting manners of the light guide plate 101, the optical diaphragm 115, and the light source circuit board 105 are well known in the art, and therefore will not be repeated herein.

The structure of the backlight module 10 will be illustrated in detail in the following.

Figure 3:
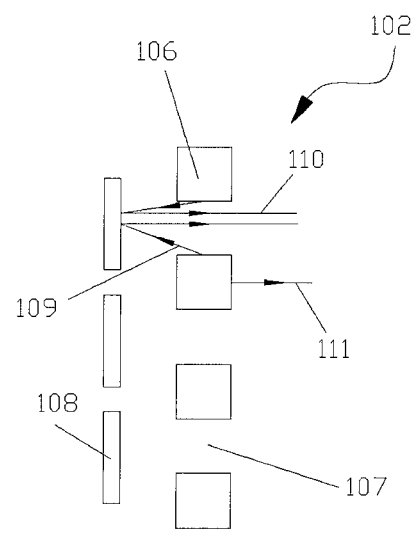
FIG. 3 shows a partial view of FIG. 1 along A-A.

FIG. 3 shows a partial view of FIG. 1 along A-A. As depicted in FIG. 3, the light source 102 includes a plurality of luminous points 106, which are arranged along a line and spaced from one another. That is, a space 107 is formed between every two adjacent luminous points 106. Preferably, the luminous points 106 can be in the form of light-emitting diodes (LEDs).

No light exits from the space 107. That is, the luminous points 106 and the spaces 107 will form contrasting areas of bright and dark within the light source 102, which might render light in the light guide plate 101 inhomogeneous, and finally generate high bright spots on the liquid crystal display 20. In this connection, a reflective member 108 is arranged within the reflective side 104, directly facing the space 107 formed between every two adjacent luminous points. That is, the reflective member 108 is located between the light source 102 and the frame 103, as indicated in FIG. 1. The reflective member 108 will reflect scattered light 109 that enters the space 107 to the light guide plate 101. That is, the reflective member 108 functions similarly as a light source located in the space 107, and thus a difference of brightness formed between the luminous points 106 and the spaces 107 can be attenuated or even eliminated. This would homogenize light in the light guide plate as well, thereby preventing appearance of high bright spots on the liquid crystal display 20.

Preferably, the reflective member 108 can be fixedly arranged on the frame 103, directly facing the space 107. This enables the frame 103 to support and limit the reflective member 108, so as to prevent the reflective member 108 from being accidently dislocated.

As FIG. 1 further illustrates, the reflective member 108 can be in the form of a concave member. Preferably, the reflective member 108 can be arranged with a concave surface facing the luminous point 106, and the scattered light 109 can enter the concave member after passing through a focus of the reflective member 108. As such, the reflective member 108 can capture the scattered light 109 in all directions, and collimate the scattered light 109 into parallel light 110, which then enters the light-incident side of the light guide plate 101. The parallel light 110 and light 111 which directly enters the light-incident side of the light guide plate 101 from the luminous points 106 are in parallel with each other, and therefore can be transmitted in an exactly same manner by the light guide plate 101. As a result, the homogeneity of brightness of the liquid crystal display 20 can be further enhanced.

Referring back to FIG. 1, the backlight module 10 further comprises a reflective sheet 112 arranged below the light guide plate 101. The reflective sheet 112 can be used for reflecting light exiting from below the light guide plate 101 back into the light guide plate 101, so as to reinforce brightness of the liquid crystal display 20.

In the backlight module 10 of the present disclosure, the reflective sheet 112 extends toward the reflective member 108 to contact the reflective member 108. Preferably, a contact zone 113 between the reflective sheet 112 and the reflective member 108 is located inside the reflective side 104. This enables reflective light exiting from the contact zone 113 to be reflected again and enter the light guide plate 101, thus enhancing brightness of the liquid crystal display 20.

The reflective sheet 112 can also be formed into one piece with the reflective member 108. Since the reflective sheet 112 is stably mounted under the light guide plate 101 without dislocation, the reflective member 108 will not dislocate, either. That is, the reflective member 108 can be prevented from accidental dislocation completely. Therefore, the liquid crystal display 20 can be manufactured with favorable stability in display effects thereof.

Figure 4:
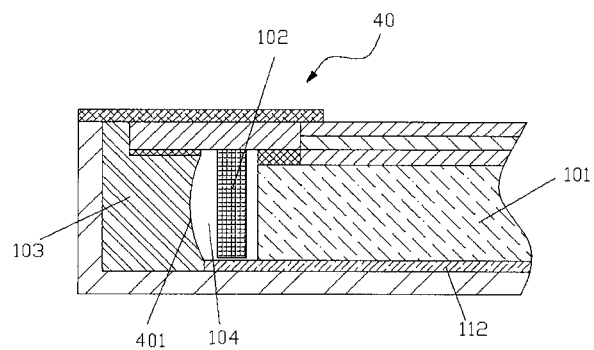
FIG. 4 schematically shows the structure of a backlight module according to a second embodiment of the present disclosure.

FIG. 4 schematically shows a backlight module 40 according to another embodiment of the present disclosure. The structure of the backlight module 40 is substantially the same as that of the backlight module 10 as depicted in FIG. 1. In the following, only differences therebetween will be illustrated in detail.

As indicated in FIG. 4, the frame 103 is provided with a concave structure 401 in a region thereof directly facing the space 107. And the reflective member 108 as described above can be formed by coating a reflective layer on the concave structure 401. In such a structure, the reflective member 108 and the frame 103 are formed into one piece, thus completely eliminating the problem of accidental dislocation of the reflective member 108. Because no component is arranged between the light source 102 and the frame 103, the liquid crystal display 20 can be provided with a rather narrow frame, or even with no frame. In addition, since a separate reflective member 108 does not actually exist, a mounting step can be saved in manufacturing the liquid crystal display 20, thus significantly improving production efficiency thereof.

Although the present disclosure has been described with reference to preferred embodiments, various modifications and variants to the present disclosure may be made by anyone skilled in the art, without departing from the scope and spirit of the present disclosure. In particular, as long as there is no structural conflict, various embodiments as well as the respective technical features mentioned herein may be combined with one another in any manner. The present disclosure is not limited to the specific embodiments disclosed herein, but rather includes all the technical solutions falling within the scope of the claims.

The invention claimed is:

1. A backlight module, comprising a light guide plate and a light source arranged on a light-incident side of the light guide plate,
   wherein the light source includes a plurality of luminous points that are arranged along a line and spaced from each other, and is arranged with a reflective member at a reflective side thereof away from the light guide plate, the reflective member directly facing a space formed between two adjacent luminous points,
   wherein the reflective member reflects scattered light that enters the space into the light guide plate, and
   wherein the reflective member is in the form of a concave member, and the scattered light illuminates the concave member after passing through a focus of the concave member.

2. The backlight module according to claim 1, further comprising a light source circuit board electrically connected to the light source.

3. The backlight module according to claim 1, further comprising a reflective sheet, wherein the reflective sheet is arranged below the light guide plate, and extends toward the reflective member to contact the reflective member.

4. The backlight module according to claim 3, wherein a contact zone between the reflective sheet and the reflective member is located in the reflective side.

5. The backlight module according to claim 3, wherein the reflective sheet is formed into one piece with the reflective member.

6. The backlight module according to claim 1, further comprising a frame arranged in the reflective side, wherein the reflective member is located between the frame and the light source.

7. The backlight module according to claim 6, wherein the reflective member is arranged on the frame in a region thereof directly facing the space formed between two adjacent luminous points.

8. The backlight module according to claim 6, wherein the frame is arranged with a concave structure in a region thereof directly facing the space formed between two adjacent luminous points, and
   wherein the reflective member is formed by coating a reflective layer on the concave structure.

9. The backlight module according to claim 8, further comprising a light source circuit board electrically connected to the light source.

10. A liquid crystal display, comprising a backlight module,
    wherein the backlight module includes a light guide plate and a light source arranged on a light-incident side of the light guide plate,
    wherein the light source includes a plurality of luminous points that are arranged along a line and spaced from each other, and is arranged with a reflective member at a reflective side thereof away from the light guide plate, the reflective member directly facing a space formed between two adjacent luminous points,
    wherein the reflective member reflects scattered light that enters the space into the light guide plate, and
    wherein the reflective member is in the form of a concave member, and the scattered light illuminates the concave member after passing through a focus of the concave member.

* * * * *